Jan. 19, 1932.  W. S. EATON  1,842,345
RADIO OPERATED DIRECTION INDICATOR
Filed March 3, 1930
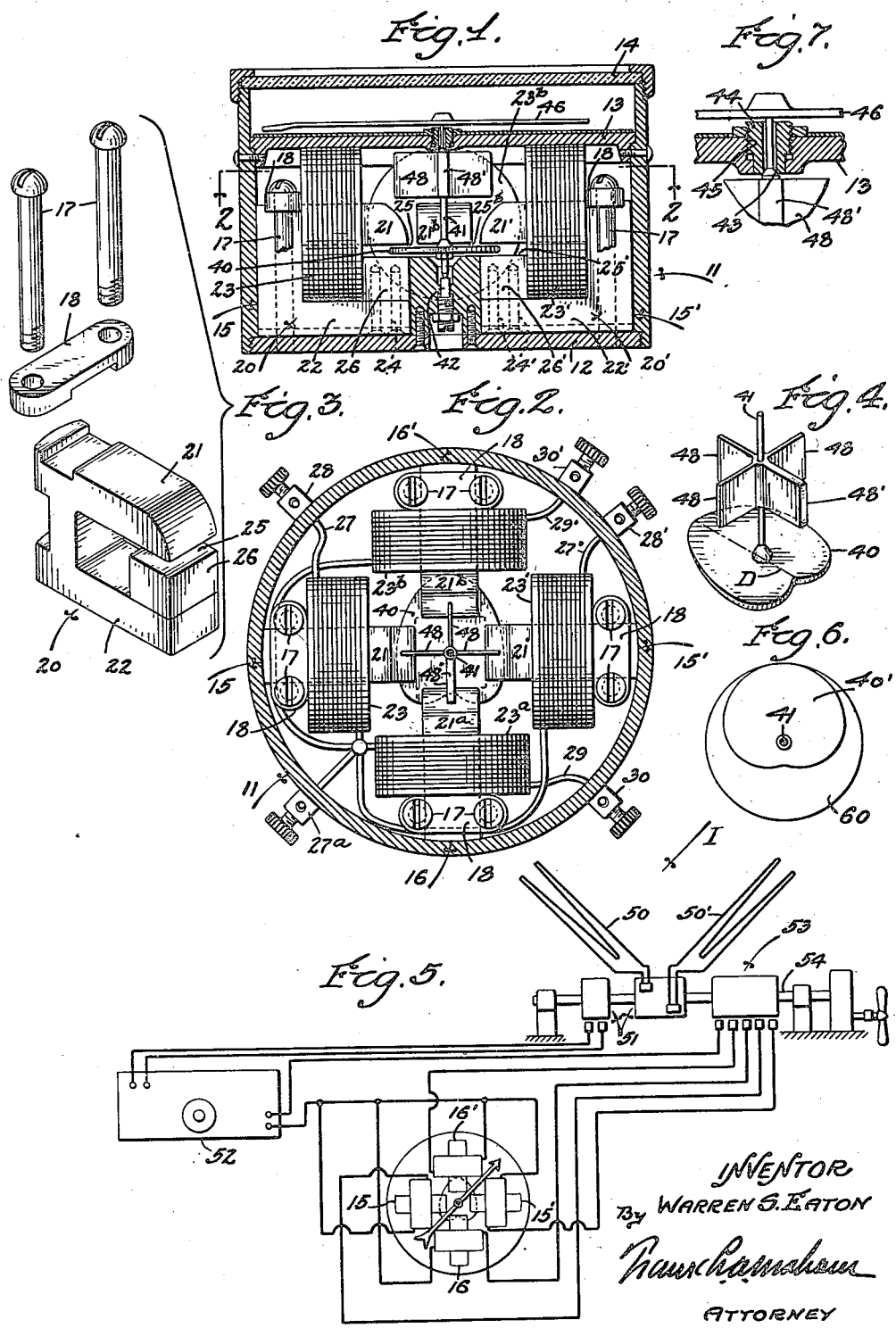

Patented Jan. 19, 1932

1,842,345

UNITED STATES PATENT OFFICE

WARREN S. EATON, OF LOS ANGELES, CALIFORNIA, ASSIGNOR TO EATON RADIO INSTRUMENT CORPORATION, OF LOS ANGELES, CALIFORNIA, A CORPORATION OF CALIFORNIA

RADIO OPERATED DIRECTION INDICATOR

Application filed March 3, 1930. Serial No. 432,740.

This invention relates to the art of determining the direction from a point to a source of wireless or radio energy, and is particularly directed to improvements in the construction of radio direction indicating instruments.

It is a primary object of this invention to produce a device of the class described, which is of simple form and construction and may be easily and economically manufactured and assembled.

It is a further object of the invention to produce a device of the class described, which is extremely compact and very light so that it is especially adapted for use in connection with aircraft.

It is also an object of the invention to produce an instrument which is very sensitive and may be depended upon to indicate accurately the position of a rapidly moving object, such as an airplane, with respect to a source of broadcast radio energy.

The details of the construction of the preferred embodiment of my invention, together with other objects attending its production, will be best understood from the following description of the accompanying drawings, which are chosen for illustrative purposes only, and in which Fig. 1 is a sectional elevation, showing a preferred form of my invention;

Fig. 2 is a plan section which may be considered as having been taken substantially in a plane represented by the line 2—2 in Fig. 1;

Fig. 3 is a detached perspective view, showing a preferred form of solenoid core or pole piece which is used in connection with that embodiment of my invention shown in Fig. 1;

Fig. 4 is a perspective view, illustrating the preferred form of rotor which is to be used in connection with my invention;

Fig. 5 is a diagrammatic view illustrating in a general way the manner in which the indicator shown in Figs. 1 and 2 is used in connection with a radio circuit for determining the direction from a point to a source of broadcast radio energy; and Fig. 6 is a plan view of a modified form of rotor.

Fig. 7 is a partial sectional view enlarged to show the details in the construction of the top bearing.

More particularly describing the invention as herein illustrated, reference numeral 11 indicates a casing provided with a base plate 12, a diaphragm plate 13 and a cover glass 14.

A plurality of electromagnets, generally indicated by reference numerals 15, 15′ and 16, 16′, are shown as being symmetrically arranged about a common center and as being mounted upon the base plate 12 and held thereon in fixed relation with each other by means of screws 17, which are associated with clamping plates 18.

Each of the electromagnets consists of a U-shaped core member 20 and forwardly projecting tongues or arms 21 and 22. An inductance coil 23 is mounted upon the upper arm 21 in the manner illustrated in Figs. 1 and 2, and it will be understood that when electric current is flowing through the coil 23, the pole or core member 20 comprises what is, in effect, a horseshoe magnet having a pole gap 25. In order that this pole gap 25 may be made extremely narrow and the effective strength of the magnetic circuit increased and, further, to facilitate the assembly of the pole piece units, I provide the bottom tongue member 22 with an extension 26 which is attached thereto, for instance, by means of screws 24.

The electromagnets 15, 15′ and 16, 16′ are all identical with the one described above, and the elements thereof will be indicated by the same reference numerals, except that the prime mark will be used in connection with the elements in the electro-magnet 15′, and the characters $a$ and $b$ will be used in connection with the numerals designating various elements of electro-magnets 16 and 16′ respectively.

The electro-magnets 15, 15′ and 16, 16′ are arranged so that the pole gaps 25, 25′ and $25^a$, $25^b$, all lie in the same plane, and the fields of force established by the flux flowing through respective pole gaps will be effective to create the effect of a resultant unidirectional field of force which bears a predetermined relation to the electric current flowing in the inductance coils 23, 23′, 23ª, 23ᵇ.

All of the coils 23, 23′, 23ª and 23ᵇ are connected with an input terminal 27ª, and the individual coils are each connected with output terminals 28, 28′, 30 and 30′ through conductors 27, 27′, 29 and 29′.

It will be apparent to those familiar with the art that if the coils 23, 23′ and 23ª, 23ᵇ are connected through suitable receiving, tuning and commutating means to a pair of directional antennæ which are arranged in substantial parallelism with the coils mentioned, the current created by radio waves received in these antennæ will be effective to establish a magnetic field of force in each of the electromagnets 15, 15′ and 16, 16′, which is proportional in strength to the angular relation between the respective antennæ and the direction of the incoming wave.

In order that these fields of force mentioned above may be utilized to move an indicator, to indicate the direction of the incoming wave, I employ a rotor, generally indicated by reference numeral 40, which is mounted upon a rotor shaft or pivot pin 41, the lower end of which is supported by an adjustable bearing 42, and the upper end of which is supported by a bearing 43, which is formed in a bushing 44, mounted in an aperture 45 formed in the plate 13. The upper end of the rotor shaft or pivot pin 41 is provided with a needle or indicator 46, and since the rotor is made heart-shaped or of varying radii, as indicated most clearly in Figs. 2 and 4, it will be apparent that the fields of force created in the magnets or pole pieces will move the rotor into a position such that its maximum diameter D will lie along the line of the effect of the resultant unidirectional field mentioned above. Should the resultant effect of the fields of force not lie in the direction of the incoming wave, then the position of the indicator 46 may be adjusted with respect to the rotor, so as to register the direction of the incoming radio wave which is energizing the instrument.

The rotor shaft 41 is shown as being provided with a plurality of damping vanes 48, which hold the indicator against undue vibration, and it will be noted from Figs. 2 and 4 that the vane 48′, which lies above the smallest portion of the rotor plate 40 is made of greater thickness and, consequently, greater weight than the remaining vanes, so that the rotor unit is properly balanced.

Fig. 5 illustrates the manner in which the indicator described above may be used in combination with a directional receiving system. The system shown in this figure is similar to that described in my co-pending application, Serial No. 348,031, and is illustrated as embodying two directional antennæ 50 and 50′, which are positioned substantially at right angles with each other and are connected through a commutating unit 51 to a tuning and receiving set 52. The commutating unit 51 is arranged so that the two antennæ are connected alternately and in reverse phase in the circuit through the receiving and tuning set 52, and the current coming from each antenna is momentarily passed through its corresponding electromagnets 15, 15′ or 16, 16′ to a second commutator 53, which closes the circuit back to the set 52. For example, during a part of the rotation of the commutator shaft 54, the antenna 50 is cut out of the circuit and antenna 50′ is connected into the circuit so that the current flows from antenna 50′ to the receiving set 52 and into the electro-magnet 16. During another part of the rotation of the commutator shaft 54, the circuit is closed through antenna 50 and electro-magnet 15. The circuit is next completed through antenna 50′ and electro-magnet 16′, and then through antenna 50 and electro-magnet 15′. This intermittent flow of current through the electro-magnets in the manner mentioned above is effective to establish a field of force in each of the pole pieces, the resultant effect of which is that of a unidirectional field of force which bears a predetermined directional relation to the incoming wave.

The theory underlying the operation of this system is clearly set forth in my copending application hereinbefore referred to and will, therefore, not be considered in detail, other than to say that the number of antennæ may be varied, the corresponding variations being made in the number of electromagnets to produce substantially the same result as is produced by the system described above.

In Fig. 6, I show a modified form of rotor in which the balance thereof is effected by having the magnetic part 60 surround a non-magnetic balancing part 40′.

It is to be understood that, by referring to the electromagnets as being arranged and connected in substantial parallelism with the directional antennæ, I do not mean to limit myself to a construction in which each set of electromagnets is directionally parallel to its corresponding antennæ, but that each set of electromagnets does bear a predetermined relation to the corresponding antennæ, so that the indicator carried by the rotor shaft or pivot pin may be associated with a suitable dial to determine accurately the direction of the incoming wave. It will, of course, be understood that it is necessary, for the purpose of swinging the rotor by means of the magnetic fields established by the current excited in the antennæ, to make the rotor of varying pole face radii or varying peripheral thickness so that the portion thereof having the greatest diameter or thickness will be moved into the resultant line of force created by the magnets or the pole pieces. In other words, the rotor should be constructed so as to vary the air gap density between the pole faces in a manner which will cause the rotor to assume a predetermined position with respect to the effect of a resultant unidirectional field of force established by the magnetic fields.

It is well known to those familiar with the construction and operation of radio direction indicators, that there is a possible error of 180° in the readings, which may be obtained from a system embodying a pair of directional antennæ, and that this error may be corrected by introducing into the circuit an open antenna which changes the usual figure 8 characteristics of the resultant field of force created by a system of directional or loop antennæ into a field having cardioid or heart-shaped characteristics. For the purpose of providing a check upon the instrument contemplated by this invention and to obviate the possibility of having this error of 180°, I prefer to use the system contemplated by this invention in combination with an open antenna. Such construction being well known to those familiar with the art, it is not illustrated in the drawings and will receive no further mention in the specification.

While the present invention is based on direction indication, and it has been described that the indicator needle will swing into the line of direction to the source of the received energy, it will of course be understood that this will occur only when the indicator needle is in a horizontal position. However, the indicator needle will always turn to the same position on the dial when indicating the same line of direction, regardless of the position of the instrument, and therefore when the face of the instrument is not disposed horizontally, as when the instrument is mounted on an instrument board, it should be arranged so that the needle will be in an upright position when the vehicle is headed along the line of direction indicated by the indicator needle of the instrument.

The system shown in the drawings has been chosen for illustrative purposes only, and it is to be understood that the scope of the invention is not limited to the precise description set forth above, but includes whatever changes fairly come within the spirit of the appended claims.

I claim as my invention:

1. In combination with a set of directional radio antennæ and means for selectively receiving and tuning radio impulses received by said antennæ, a direction indicator to indicate the direction to a source of electro-magnetic energy embodying: a plurality of electromagnets arranged and connected in predetermined relation with said antennæ, said electromagnets having narrow pole gaps in a common plane; and a rotor of varying radii and relatively high magnetic permeability, arranged so as to rotate with its periphery in the pole gaps of said magnets and align the maximum radius of said rotor plate with the resultant field of said electromagnets and an indicator operatively connected with said rotor to indicate said direction.

2. In combination with a set of directional radio antennæ and means for selectively receiving and tuning radio impulses received by said antennæ, a direction indicator to indicate the direction to a source of electro-magnetic energy embodying: a plurality of electromagnets arranged and connected in predetermined relation with said antennæ, said electromagnets having narrow pole gaps in a common plane; and a heart-shaped rotor of relatively high magnetic permeability, arranged so as to rotate with its periphery in the pole gaps of said magnets and align the maximum radius of said rotor plate with the resultant field of said electromagnets and an indicator operatively connected with said rotor to indicate said direction.

3. In combination with a set of directional radio antennæ and means for selectively receiving and tuning radio impulses received by said antennæ, a direction indicator to indicate the direction to a source of electro-magnetic energy embodying: a plurality of electromagnets arranged and connected in predetermined relation with said antennæ, said electromagnets having narrow pole gaps in a common plane; a rotor shaft mounted in the area encompassed by the poles of said magnets; and a rotor plate mounted on said rotor shaft with its periphery in the pole gaps of said magnets.

4. In combination with a set of directional radio antennæ and means for selectively receiving and tuning radio impulses received by said antennæ, a direction indicator to indicate the direction to a source of electro-magnetic energy embodying: a plurality of electromagnets arranged and connected in predetermined relation with said antennæ, said electromagnets having narrow pole gaps in a common plane; a rotor shaft mounted in the area encompassed by the poles of said magnets; a rotor plate of varying radii mounted on said rotor shaft with its periphery in the pole gaps of said magnets; and an indicator operatively connected with said rotor shaft to indicate said direction.

5. In combination with a set of directional radio antennæ and means for selectively receiving and tuning radio impulses received by said antennæ, a direction indicator to indicate the direction to a source of electro-magnetic energy embodying: a plurality of electromagnets arranged and connected in substantial parallelism with said antennæ, said electromagnets having narrow pole gaps in a common plane; a rotor shaft mounted in the area encompassed by the poles of said magnets; a rotor plate of varying radii mounted on said rotor shaft with its periphery in the pole gaps of said magnets; and an indicator on said rotor shaft, said indicator being positioned parallel to the longest radius of said rotor plate.

6. In combination with a set of directional radio antennæ and means for selectively receiving and tuning radio impulses received by said antennæ, a direction indicator to indicate the direction to a source of electro-magnetic energy embodying: a plurality of electromagnets arranged and connected in substantial parallelism with said antennæ, said electromagnets having narrow pole gaps in a common plane; a rotor shaft mounted in the area encompassed by the poles of said magnets; a heart-shaped rotor plate mounted on said rotor shaft with its periphery in the pole gaps of said magnets; and an indicator on said rotor shaft, said indicator being positioned parallel to the longest diameter of said rotor plate.

7. In combination with a set of directional radio antennæ and means for selectively receiving and tuning radio impulses received by said antennæ, a direction indicator to indicate the direction to a source of electro-magnetic energy embodying: a plurality of electromagnets arranged and connected in substantial parallelism with said antennæ, said electromagnets having narrow pole gaps in a common plane; a rotor shaft mounted in the area encompassed by the poles of said magnets; a rotor plate of varying radii mounted on said rotor shaft with its periphery in the pole gaps of said magnets; and damping vanes mounted on said rotor shaft and an indicator operatively connected with said rotor to indicate said direction.

8. An indicator of the class described, embodying: a casing; a shaft rotatably mounted in said casing; a rotor plate of symmetrically varying radii mounted on said shaft; and a plurality of oppositely disposed sets of electromagnets arranged in predetermined spaced relation about said shaft, with the pole gaps thereof in the plane of said rotor plate, the periphery of said rotor lying in said pole gaps and an indicator mounted on said shaft.

9. An indicator of the class described, embodying: a casing; a shaft rotatably mounted in said casing; a rotor plate of varying radii mounted on said shaft; and a plurality of oppositely disposed sets of electromagnets arranged in predetermined spaced relation about said shaft, with the pole gaps thereof in the plane of said rotor plate, the periphery of said rotor lying in said pole gaps, each of said electromagnets comprising a U-shaped member having top and bottom arms, and an inductance coil on one of said arms and an indicator mounted on said shaft.

10. An indicator of the class described, embodying: a casing; a shaft rotatably mounted in said casing; a rotor plate of varying radii mounted on said shaft; and a plurality of oppositely disposed sets of electromagnets arranged in predetermined spaced relation about said shaft, with the pole gaps thereof in the plane of said rotor plate, the periphery of said rotor lying in said pole gaps, each of said electromagnets comprising a U-shaped member having top and bottom arms, an inductance coil on one of said arms and a closure block on the other arm for narrowing the pole gap and an indicator mounted on said shaft.

11. An indicator of the class described, embodying: a casing; a shaft rotatably mounted in said casing; damping vanes mounted on said shaft; a rotor plate of varying radii mounted on said rotor shaft; and a plurality of oppositely disposed sets of electromagnets arranged in predetermined spaced relation about said shaft, with the pole gaps thereof in the plane of said rotor plate, the periphery of said rotor lying in said pole gaps and an indicator mounted on said shaft.

12. An indicator of the class described, embodying: a casing; a shaft rotatably mounted in said casing; damping vanes mounted on said shaft; a rotor plate of varying radii mounted on said rotor shaft; and a plurality of oppositely disposed sets of electromagnets arranged in predetermined spaced relation about said shaft, with the pole gaps thereof in the plane of said rotor plate, the periphery of said rotor lying in said pole gaps, said vanes being proportioned so as to balance the weight of said rotor plate and an indicator mounted on said shaft.

13. An indicator of the class described, embodying: a casing; a shaft rotatably mounted in said casing; damping vanes mounted on said shaft; a rotor plate of varying radii mounted on said rotor shaft; and a plurality of oppositely disposed sets of electromagnets arranged in predetermined spaced relation about said shaft, with the pole gaps thereof in the plane of said rotor plate, the periphery of said rotor lying in said pole gaps, one of said vanes being heavier than the others and an indicator mounted on said shaft.

14. In combination with a set of directional radio antennæ and means for selectively receiving and tuning radio impulses received by said antennæ, a direction indicator to indicate the direction to a source of electro-magnetic energy embodying: a plurality of electromagnets arranged and connected in predetermined relation with said antennæ, said electromagnets having pole gaps in a common plane; and a rotor of relatively high magnetic permeability, arranged so as to rotate with its periphery in the pole gaps of said magnets, said rotor being shaped so as to vary the air gap density between the pole faces and an indicator operatively connected with said rotor to indicate said direction.

15. In combination with a set of directional radio antennæ and means for selectively receiving and tuning radio impulses received by said antennæ, a direction indicator to indicate the direction to a source of electromagnetic energy embodying: a plurality of electromagnets arranged and connected in substantial parallelism with said antennæ, said electromagnets having pole gaps in a common plane; and a rotor of relatively high magnetic permeability, arranged so as to rotate with its periphery in the pole gaps of said magnets, said rotor being shaped to effect a unidirectional alignment with the resultant field of said electromagnets and an indicator operatively connected with said rotor to indicate said direction.

16. In a direction indicator to indicate the direction to a source of electro-magnetic energy, a plurality of electro-magnets disposed about an axis and provided with pole gaps and a rotor of varying radii arranged so as to rotate with its periphery in the pole gaps of said magnets.

17. In a direction indicator to indicate the direction to a source of electro-magnetic energy, a plurality of electro-magnets symmetrically disposed about an axis and provided with pole gaps in a common plane and a rotor of varying radii and relatively high permeability arranged so as to rotate with is periphery in the pole gaps of said magnets.

18. In a direction indicator to indicate the direction to a source of electro-magnetic energy, a plurality of electro-magnets disposed about an axis and provided with pole gaps, and a balanced rotor of varying radii arranged so as to rotate with its periphery in the pole gaps of said magnets.

19. In a direction indicator to indicate the direction to a source of electro-magnetic energy, a plurality of electro-magnets symmetrically disposed about an axis and provided with pole gaps in a common plane and a balanced rotor of varying radii and relatively high permeability arranged so as to rotate with its periphery in the pole gaps of said magnets.

20. In a direction indicator to indicate the direction to a source of electro-magnetic energy, a plurality of electro-magnets symmetrically disposed about an axis and provided with pole gaps in a common plane, a rotor of varying radii and relatively high permeability arranged so as to rotate with its periphery in the pole gaps of said magnets, and a balancing member mounted in said rotor.

21. In an indicator for indicating the direction to a source of electro-magnetic energy, a plurality of electro-magnets disposed about an axis and provided with narrow pole gaps, a balanced rotor of varying radii rotatably mounted in the area bounded by the magnets with its periphery in said pole gaps, and a direction indicator member carried by said rotor in a predetermined angular relation thereon to indicate the direction to the source of electro-magnetic energy when the maximum radius of said rotor is aligned with the resultant field of said electro-magnets.

22. In an indicator for indicating the direction to a source of electro-magnetic energy, a plurality of electro-magnets disposed about an axis and provided with narrow pole gaps, a rotor of varying radii rotatably mounted in the area bounded by the magnets with its periphery in said pole gaps, a balancing member for balancing said rotor, and a direction indicator member carried by said rotor in a predetermined angular relation thereon to indicate the direction to the source of electro-magnetic energy when the maximum radius of said rotor is aligned with the resultant field of said electro-magnets.

23. In an indicator for indicating the direction to a source of electro-magnetic energy, a plurality of electro-magnets disposed about an axis and provided with narrow pole gaps, a rotor of varying radii rotatably mounted in the area bounded by the magnets with its periphery in said pole gaps, and a balancing member mounted in said rotor for balancing said rotor, and a direction indicator member carried by said rotor in a predetermined angular relation thereon to indicate the direction to the source of electro-magnetic energy when the maximum radius of said rotor is aligned with the resultant field of said electro-magnets.

In testimony whereof, I have hereunto set my hand this 18th day of February, 1930.

WARREN S. EATON.